(12) United States Patent
Inagawa et al.

(10) Patent No.: US 7,000,153 B2
(45) Date of Patent: Feb. 14, 2006

(54) COMPUTER APPARATUS AND METHOD OF DIAGNOSING THE COMPUTER APPARATUS AND REPLACING, REPAIRING OR ADDING HARDWARE DURING NON-STOP OPERATION OF THE COMPUTER APPARATUS

(75) Inventors: Takashi Inagawa, Owariasahi (JP); Yasuo Hirata, Nisshin (JP); Teiji Karasaki, Isehara (JP); Shinji Kimura, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 309 days.

(21) Appl. No.: 10/160,085

(22) Filed: Jun. 4, 2002

(65) Prior Publication Data

US 2002/0184563 A1 Dec. 5, 2002

(30) Foreign Application Priority Data

Jun. 5, 2001 (JP) ............................. 2001-170117

(51) Int. Cl.
*G06F 11/00* (2006.01)
(52) U.S. Cl. .................... 714/44; 710/302; 718/106
(58) Field of Classification Search ............. 714/11, 714/12, 13, 44; 710/302; 718/105, 106
See application file for complete search history.

(56) References Cited

U.S. PATENT DOCUMENTS

| | | | |
|---|---|---|---|
| 6,212,585 B1 * | 4/2001 | Chrabaszcz ................. | 710/302 |
| 6,247,080 B1 * | 6/2001 | Wallach et al. ............. | 710/302 |
| 6,487,623 B1 * | 11/2002 | Emerson et al. ............ | 710/302 |
| 6,691,146 B1 * | 2/2004 | Armstrong et al. ......... | 718/100 |
| 2002/0087611 A1 * | 7/2002 | Tanaka et al. .................. | 709/1 |
| 2002/0108074 A1 * | 8/2002 | Shimooka et al. ............ | 714/25 |
| 2002/0133743 A1 * | 9/2002 | Oldfield et al. ............... | 714/11 |
| 2002/0184576 A1 * | 12/2002 | Arndt et al. ................... | 714/48 |

FOREIGN PATENT DOCUMENTS

| | | |
|---|---|---|
| JP | 2001236237 | 8/2001 |
| JP | 200282816 | 3/2002 |

OTHER PUBLICATIONS

System Commander: User Manual, V. Communications, Inc., Oct. 1996, Entire.*
"PCI Hot-Plug Specification Revision 1.0", Oct. 6, 1997 (Copyright(c) 1997, PCI Special Interest Group), pp. 1-38.
DAL (Darma (Dependable Autonomous Hard Real-Time Management) Abstraction Layer), pamphlet "Ex-Manager", Dec. 1999, Hitachi, Ltd.

* cited by examiner

*Primary Examiner*—Robert Beausoliel
*Assistant Examiner*—Christopher McCarthy
(74) *Attorney, Agent, or Firm*—Mattingly, Stanger, Malur & Brundidge, P.C.

(57) ABSTRACT

A computer apparatus and a method of diagnosing are provided that increase reliability and make non-stop operation possible even at a hardware repair, replacement, or addition time. The computer apparatus, which comprises a main OS and a sub OS, may have a peripheral device or an I/O card repaired, replaced, or added with power on. The repaired, replaced, or added hardware component is disconnected from the main OS. With the main OS performing usual processing, the sub OS uses a test/maintenance program to check the operation of the repaired, replaced, or added hardware component and then passes the control of the hardware component to the main OS.

5 Claims, 2 Drawing Sheets

COMPUTER APPARATUS AND METHOD OF DIAGNOSING THE COMPUTER APPARATUS AND REPLACING, REPAIRING OR ADDING HARDWARE DURING NON-STOP OPERATION OF THE COMPUTER APPARATUS

BACKGROUND OF THE INVENTION

The present invention relates to a computer apparatus and a method of diagnosing, and more particularly to a computer apparatus in which a hardware component may be replaced, repaired, or added with power on and a method of diagnosing that uses the computer apparatus.

As described in "PCI Hot-Plug Specification Revision 1.0", Oct. 6, 1997 (Copyright(c) 1997, PCI Special Interest Group), a PCI card connected to the PCI bus on a today's computer apparatus may be removed, repaired, replaced, and then connected again for continued PCI card operation even during OS operation without turning off the computer power (hereinafter called "hot swapping").

Recently, a computer, especially a server, is required to perform non-stop operation (24 hours a day, 365 days a year). Therefore, hot swapping described above makes it possible to repair or replace a hardware component, such as a PCI card, with the OS running and, then, to put the component into operation again under control of the OS again.

However, when a hardware component such as a PCI card is repaired or replaced with the OS running and then is put into operation again under control of the OS, there is no way to check if the repaired or replaced PCI card operates properly or if the card is mounted correctly. Whether or not the repair or replacement has been done successfully is not known until control is passed back to the OS and the component starts operation under control of the OS. For a server that is required to perform non-stop operation, it is dangerous to put a repaired or replaced PCI card under OS control while worrying whether it operates properly.

Similarly, a PCI card or a peripheral device may be added even during non-stop operation (hereinafter called "hot plugging"). However, after addition, it is dangerous to put the added PCI card or peripheral device under OS control without checking the operation.

To avoid such a danger, a PCI card is repaired, replaced or added with the power off. Then, after the hardware component is repaired, replaced, or added, the OS environment containing a test program for checking the hardware is started and, after confirming that the hardware operation is normal with the use of the test program, the power is turned off or the system is re-booted to start the main OS and to bring the system back into normal operation. The problem with this method is that the non-stop operation cannot be performed because this method requires the main OS to stop operation while the hardware component is repaired, replaced, or added and while the test/maintenance program checks the hardware operation.

SUMMARY OF THE INVENTION

It is an object of the present invention to provide a computer apparatus and a method of diagnosing that ensure high reliability and non-stop operation even when a hardware component is repaired, replaced, or added.

To achieve the above object, the present invention provides a computer apparatus in which a first OS and a second OS may be installed and in which a hardware component may be repaired, replaced, or added with power on, wherein the repaired, replaced, or added hardware component is disconnected from the first OS and, after an operation of the repaired, replaced, or added hardware component is checked by the second OS with the first OS performing usual processing, a control of the hardware component is passed to the first OS.

This configuration ensures increased reliability even at a hardware component repair, replacement, or addition time and, at the same time, makes non-stop operation possible.

In addition, to achieve the above object, the present invention provides a method of diagnosing that uses a computer apparatus in which a first OS and a second OS may be installed and in which a hardware component may be repaired, replaced, or added with power on, wherein, with the first OS performing usual processing, the second OS uses a test program to check an operation of the repaired, replaced, or added hardware component.

This method ensures increased reliability even at a hardware component repair, replacement, or addition time and, at the same time, makes non-stop operation possible.

Other objects, features and advantages of the invention will become apparent from the following description of the embodiments of the invention taken in conjunction with the accompanying drawings.

DETAILED DESCRIPTION OF THE EMBODIMENTS

Figure 1:
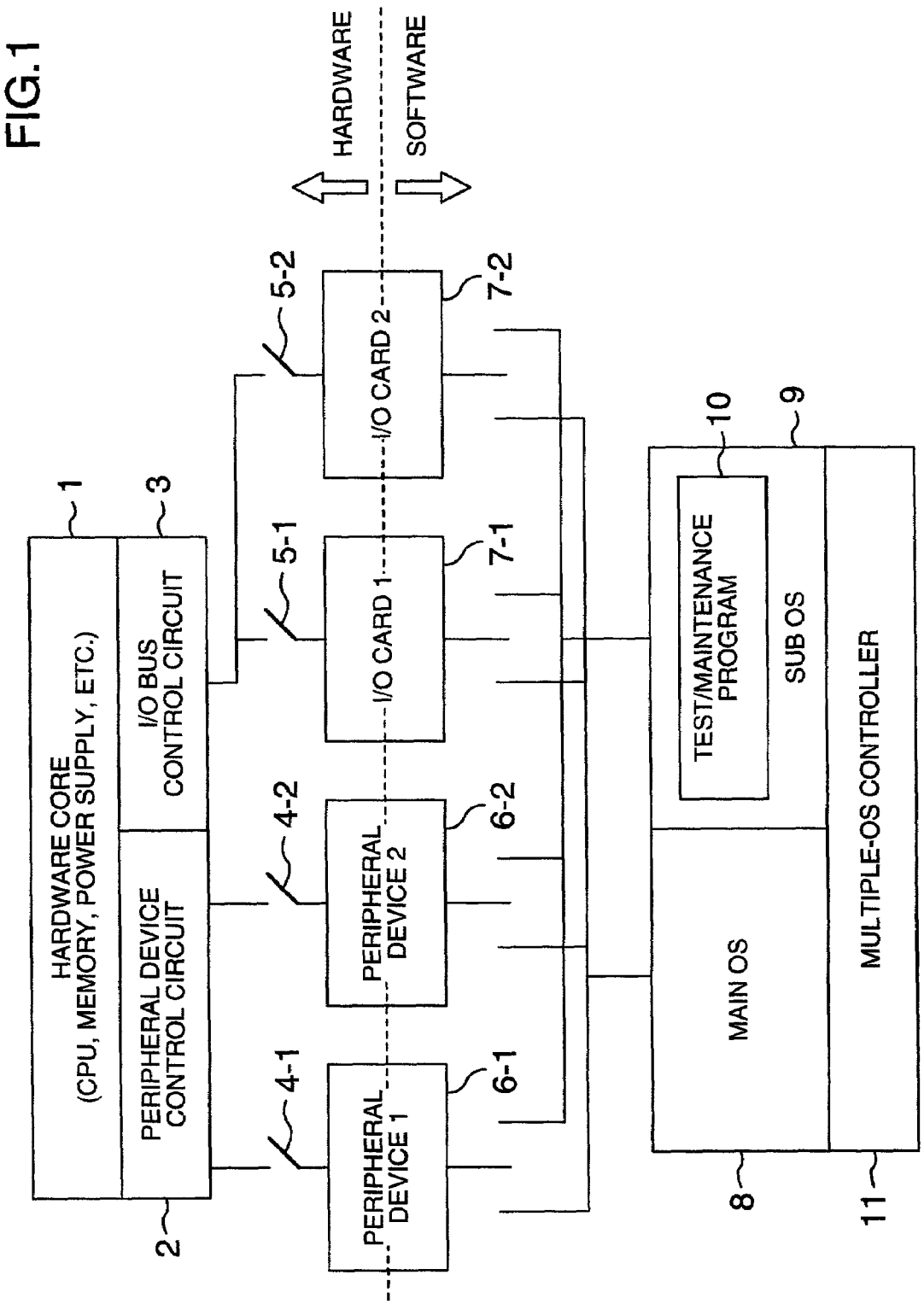
FIG. 1 is a block diagram showing the system configuration of a computer apparatus in one embodiment of the present invention.
Figure 2:
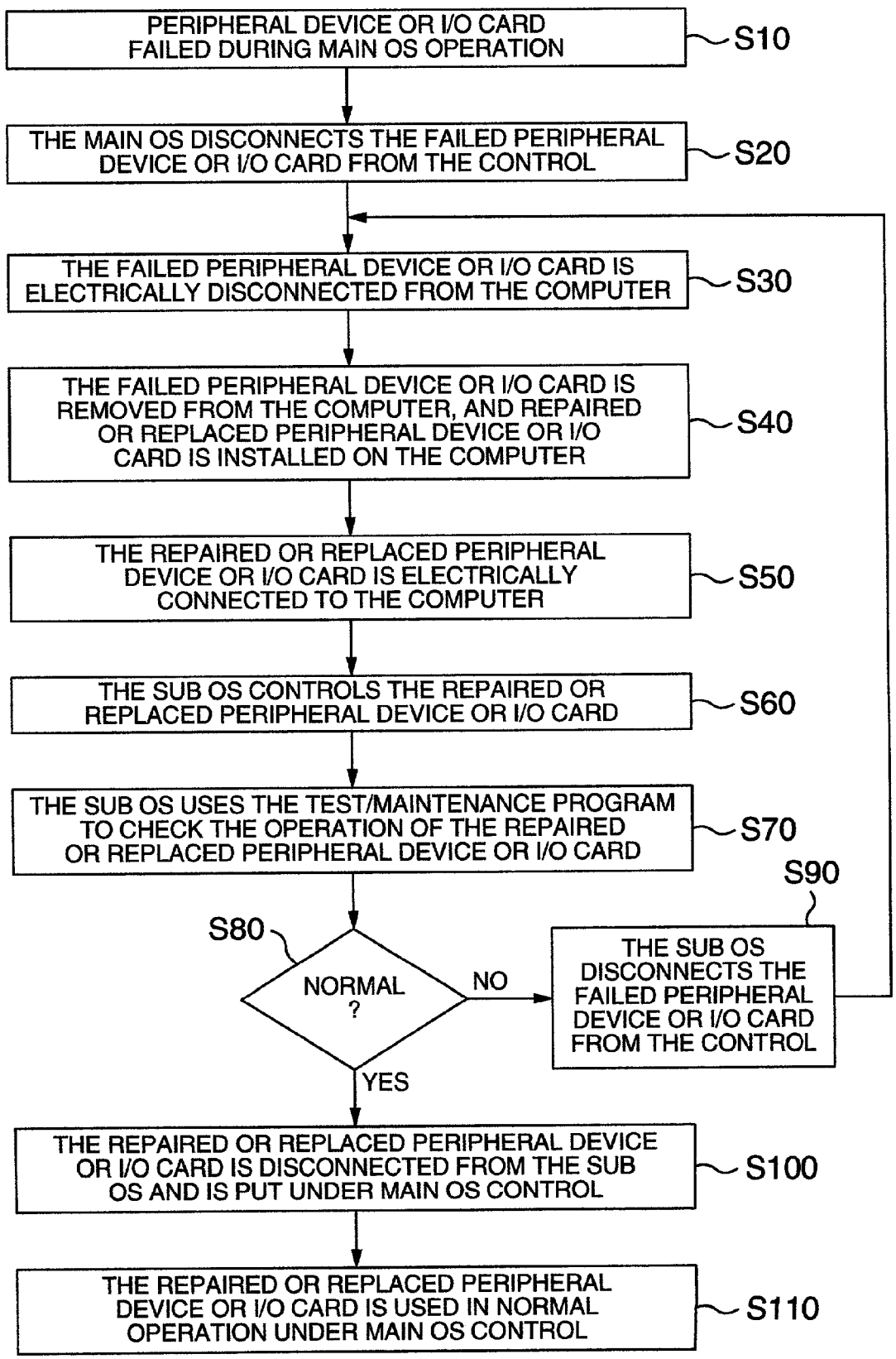
FIG. 2 is a flowchart showing the processing of a hardware diagnostic method using the computer apparatus in one embodiment of the present invention.

With reference to FIGS. 1 and 2, the configuration and the operation of a computer apparatus in one embodiment of the present invention will be described.

FIG. 1 is a block diagram showing the system configuration of a computer apparatus in one embodiment of the present invention, and FIG. 2 is a flowchart showing the processing of a hardware diagnosing method using the computer apparatus in one embodiment of the present invention.

First, with reference to FIG. 1, the hardware configuration and software configuration of the computer apparatus in the embodiment will be described. In FIG. 1, the part above the dotted line in the center of the figure indicates the hardware configuration, and the part below the dotted line indicates the software configuration.

First, the hardware will be described. The computer apparatus comprises a hardware core 1, a periperal device control circuit 2, and an I/O bus control circuit 3. The hardware core 1 comprises a CPU, a memory, a power supply, and so on. When the hardware core 1 fails, the computer apparatus cannot perform operation. The peripheral device control circuit 2 controls peripheral devices (6-1 and/or 6-2). The I/O bus control circuit 3 controls I/O cards (7-1 and/or 7-2).

Peripheral device connection switches (4-1 and/or 4-2) are provided between the peripheral devices (6-1 and/or 6-2) and the peripheral device control circuit 2 to allow the peripheral devices (6-1 and/or 6-2) to be hot-swapped or hot-plugged. Note that, depending upon the interface between the peripheral devices (6-1 and/or 6-2) and the peripheral device control circuit 2, the peripheral device connection switches (4-1 and/or 4-2) are not always needed. I/O bus connection switches (5-1 and/or 5-2) are provided in an I/O bus, such as a PCI bus connecting the I/O cards (7-1 and/or 7-2) to the I/O bus control circuit 3, and support hot-swapping.

Next, the software configuration will be described. A multiple-OS controller 11 enables a plurality of OSs to be installed on one hardware unit. Under control of the multiple-OS controller 11, a main OS 8 and a sub OS 9 are installed. Under control of the sub OS 9, a test/maintenance program 10 is installed. The main OS 8 and the sub OS 9 may control the peripheral devices (6-1 and/or 6-2) and the I/O cards (7-1 and/or 7-2) as necessary. For example, DAL (DARMA (Dependable Autonomous Hard Real-Time Management) Abstraction Layer), described in the pamphlet "Ex-Manager", Dec. 1999, Information Device Operation Division of Hitachi Ltd., may be used as the multiple-OS controller 11. Windows NT may be used, for example, as the main OS 8 installed under control of the multiple-OS controller 11, and Ex-Kernel may be used as the sub OS 9.

"Windows NT is a product and trademark of Microsoft Corporation of Redmond, Wash."

Next, a hardware diagnosing method in the embodiment will be described with reference to FIG. 2.

Normally, the peripheral devices (6-1 and/or 6-2) or the I/O cards (7-1 and/or 7-2) operate under control of the main OS 8.

When the main OS 8 detects a failure in the peripheral devices (6-1 and/or 6-2) or the I/O cards (7-1 and/or 7-2) during operation in step S10, processing in the steps beginning with step S20 are executed. In this embodiment, the failed peripheral devices (6-1 and/or 6-2) or I/O cards (7-1 and/or 7-2) is repaired or replaced and then safely put under the control of the main OS 8 again without stopping the operation of the main OS 8. In the description below, it is assumed that an I/O card 1 (7-1) has failed. The description also applies when an I/O card 2 (7-2) or peripheral device 6-1 or 6-2 fails.

For example, when a failure is detected in the I/O card 1 (7-1), the main OS 8 disconnects the failed I/O card 1 (7-1) from the control in step S20.

Next, in step S30, the failed I/O card 1 (7-1) is electrically disconnected from the I/O bus control circuit 3 by an I/O bus connection switch 5-1. The I/O bus connection switch 5-1 may be switched off, for example, by the main OS 8, by a repairman of the failed part, or by removing the failed I/O card.

Next, in step S40, the repairman removes the I/O card 1 (7-1) from the computer for repairing it. The repaired I/O card 1 (7-1) is installed in the slot from where it was removed.

Next, in step S50, the repaired I/O card 1 (7-1) is electrically connected to the I/O bus control circuit 3 by the operation of the I/O bus connection switch 5-1.

Next, in step S60, the sub OS 9 controls the repaired I/O card 1 (7-1). That is, this embodiment is characterized in that the sub OS 9 controls the repaired I/O card 1 (7-1). This allows the main OS 8 to continue normal operation, making non-stop operation possible.

Next, in step S70, the sub OS 9 uses the test/maintenance program 10 to check the operation of the repaired I/O card 1 (7-1).

Next, in step S80, the sub OS 9 checks if the operation of the I/O card 1 (7-1) for which the test/maintenance program 10 was executed is normal. If the operation is not normal, control is passed to step S90; if the operation is normal, control is passed to step S100.

If the operation of the I/O card 1 (7-1) is not normal, the sub OS 9 disconnects the abnormal I/O card 1 (7-1) from the control in step S90 and repeats the operations following step S30 to repair the I/O card 1 (7-1) again.

On the other hand, if the operation of the I/O card 1 (7-1) is normal, the sub OS 9 removes the repaired I/O card 1 (7-1) from the control in step S100 and passes the control of the I/O card 1 (7-1) to the main OS 8.

Next, in step S110, the main OS 8 puts the repaired I/O card 1 (7-1) in normal operation. Through the sequence of operations described above, the failed I/O card 1 (7-1) is repaired without having to interrupt the operation of the main OS.

In the above description, the method is used to repair or replace a failed peripheral devices (6-1 and/or 6-2) or I/O cards (7-1 and/or 7-2). The processing steps following step S50 may also be used to add a peripheral devices (6-1 and/or 6-2) or an I/O cards (7-1 and/or 7-2) without having to interrupt the processing of the main OS.

For a PC card used on a notebook PC, when a new PC card is inserted into the PC card slot, it is also possible to check the operation of the inserted PC card with the use of the sub OS and then to pass the control of the inserted PC card to the main OS.

In this embodiment, because the test/maintenance program is used to check the operation of a repaired or added hardware component after it is installed on the computer as described above, the hardware component is passed reliably to the main OS. Thus, the so-called the hot-swapping or hot-plugging operation may be executed under guarantee of the test/maintenance program. The main OS may use the hardware that is guaranteed to operate properly and, therefore, ensures increased reliability. In addition, the main OS, capable of continuing usual processing, may perform non-stop operation.

From a security point of view, the main OS is responsible for managing critical processing or important data while the sub OS is responsible only for computer apparatus maintenance operations such as the execution of the test/maintenance program. The task steps may be divided as follows: the security manager executes steps S10 and S20, the computer repair and maintenance engineer executes steps S30–S90, and the security manager executes step S100 and S110 again. This eliminates the need for the repair and maintenance engineer to directly operate the main OS with human errors taken into consideration and therefore increases system reliability.

The method according to the present invention increases security at the time of hardware repair, replacement, or addition and, at the same time, makes it possible to perform non-stop operation.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A computer apparatus comprising:
   a Central Processing Unit (CPU); and
   a memory connected to said CPU including a first Operating System (OS), a second OS and an OS controller being executed by said CPU,
   wherein said OS controller is operated to switch between said first OS and said second OS and to control said first OS and said second OS so that said second OS is executed without interrupting operation of said first OS, wherein a hardware component may be repaired, replaced, or added with power on in said computer apparatus, and wherein the repaired, replaced, or added hardware component is disconnected from said first OS and, after an operation of the repaired, replaced, or added hardware component is checked by said second OS with said first OS performing usual processing, control of the hardware component is transferred to said first OS.

2. A method of diagnosing a hardware component repaired, replaced, or added with power on in a computer apparatus in which a first Operating System (OS) and a second OS are installed and controlled under an OS controller, comprising the steps of:

performing usual processing with said first OS; and checking an operation of said repaired, replaced, or added hardware component with a test program used by said second OS without interrupting said processing with said first OS; and transferring control of said repaired, replaced or added hardware component to said first OS, after said repaired, replaced or added hardware component has been checked, under control of said OS controller.

3. A computer apparatus, comprising:

a processor;

a memory comprising a first Operating System (OS), a second OS and an OS controller, said OS controller being operated to switch between said first OS and said second OS and to control said first OS and said second OS so that said second OS is executed without interrupting operation of said first OS;

an Input/output (I/O) bus controller;

a Peripheral Component Interconnect (PCI) card adapted for hot swapping;

a peripheral device adapted for hot swapping; and an I/O bus for connecting said I/O controller and said PCI card, wherein under control by said first OS, when a failure of said PCI card or peripheral device is detected, said PCI card or said peripheral device in failure is disconnected from control by said first OS, wherein under control by said second OS, when insertion of another PCI card or peripheral device is detected, an operating status of said another PCI card or another peripheral device having been inserted is checked, and wherein when said operating status is normal, control of said another PCI card or another peripheral device having been inserted is transferred from said second OS to said first OS.

4. The computer apparatus according to claim 3, wherein said first OS is a main OS, and said second OS is a sub OS installing a test/maintenance program.

5. The computer apparatus according to claim 3, wherein under control by said second OS, when said operating status checked is not normal, said another PCI card or another peripheral device having been inserted is disconnected from control by said second OS.

* * * * *